(12) United States Patent
Enrique Salpico

(10) Patent No.: US 10,129,246 B2
(45) Date of Patent: Nov. 13, 2018

(54) ASSIGNMENT AND DISTRIBUTION OF NETWORK CONFIGURATION PARAMETERS TO DEVICES

(71) Applicant: TECTECO SECURITY SYSTEMS, S.L., Parla (Madrid) (ES)

(72) Inventor: Jose Antonio Enrique Salpico, Parla (ES)

(73) Assignee: TECTECO SECURITY SYSTEMS, S.L., Parla (Madrid) (ES)

( * ) Notice: Subject to any disclaimer, the term of this patent is extended or adjusted under 35 U.S.C. 154(b) by 186 days.

(21) Appl. No.: 15/314,915

(22) PCT Filed: May 29, 2015

(86) PCT No.: PCT/ES2015/070422
§ 371 (c)(1),
(2) Date: Nov. 29, 2016

(87) PCT Pub. No.: WO2015/181430
PCT Pub. Date: Dec. 3, 2015

(65) Prior Publication Data
US 2017/0195162 A1    Jul. 6, 2017

(30) Foreign Application Priority Data
May 29, 2014    (ES) .................................. 201430822

(51) Int. Cl.
*H04L 29/06*    (2006.01)
*G06F 21/44*    (2013.01)
(Continued)

(52) U.S. Cl.
CPC ...... *H04L 63/083* (2013.01); *G06F 17/30312* (2013.01); *G06F 21/44* (2013.01);
(Continued)

(58) Field of Classification Search
CPC ............... G06F 17/30312; G06F 21/44; G06F 21/6218; H04L 29/06102; H04L 29/06115;
(Continued)

(56) References Cited

U.S. PATENT DOCUMENTS 7,533,412 B2 *    5/2009   Teglia ..................... G06F 21/52
                                                                    713/176
7,568,092 B1       7/2009   Englund
(Continued)

FOREIGN PATENT DOCUMENTS

EP           2667664 A1     11/2013

OTHER PUBLICATIONS

"Introduction to DHCP Policies", Jan. 5, 2014, retrieved from Internet: URL:https://web.archive.org/web/20140105034844/http://technet.microsoft.com/en-us/library/dn425039.aspx.
(Continued)

*Primary Examiner* — SM A Rahman
(74) *Attorney, Agent, or Firm* — Kinney & Lange, P.A.

(57) ABSTRACT

A method, system and network element are disclosed which allows securing, customizing and generally improving network equipment (device) configuration and DHCP network address identification, assignment and distribution mechanism, such that network address and parameter configuration, assignment and distribution in a communications network is performed in a more optimum and secure manner. The DHCP protocol is improved using policies based on roles (profiles) directly linked to the physical identification of the device (for example, to its MAC address).

9 Claims, 4 Drawing Sheets

(51) Int. Cl.
  *H04L 29/12* (2006.01)
  *G06F 17/30* (2006.01)
  *H04L 12/931* (2013.01)
  *H04L 29/08* (2006.01)
  *G06F 21/62* (2013.01)

(52) U.S. Cl.
  CPC .... *G06F 21/6218* (2013.01); *H04L 29/06102* (2013.01); *H04L 29/06115* (2013.01); *H04L 29/06149* (2013.01); *H04L 29/08009* (2013.01); *H04L 29/08045* (2013.01); *H04L 49/20* (2013.01); *H04L 61/2015* (2013.01); *H04L 63/0236* (2013.01); *H04L 63/0876* (2013.01); *H04L 63/10* (2013.01); *H04L 63/101* (2013.01); *H04L 63/107* (2013.01); *H04L 63/145* (2013.01); *H04L 63/1416* (2013.01); *H04L 63/1458* (2013.01); *H04L 63/162* (2013.01); *H04L 63/20* (2013.01); *H04L 67/02* (2013.01); *H04L 61/6022* (2013.01); *H04L 69/324* (2013.01)

(58) Field of Classification Search
  CPC ........... H04L 29/06119; H04L 29/0809; H04L 29/08045; H04L 49/20; H04L 61/2015; H04L 63/0236; H04L 63/0876; H04L 63/10; H04L 63/101; H04L 63/0676; H04L 63/107; H04L 63/1416; H04L 63/145; H04L 63/1458; H04L 63/162; H04L 63/20; H04L 67/02
  USPC ....................................................... 709/227
  See application file for complete search history.

(56) References Cited

U.S. PATENT DOCUMENTS

| | | | |
|---|---|---|---|
| 7,574,202 B1 | 8/2009 | Tsao et al. | |
| 8,891,358 B2* | 11/2014 | Sampath | ................ H04L 45/00 370/216 |
| 2003/0220994 A1 | 11/2003 | Zhu | |
| 2004/0103310 A1 | 5/2004 | Sobel et al. | |
| 2006/0137005 A1 | 6/2006 | Park | |
| 2008/0209071 A1 | 8/2008 | Kubota | |
| 2009/0217350 A1 | 8/2009 | Manning et al. | |

OTHER PUBLICATIONS

Scope-level Link layer filtering using DHCP Policies in Windows Server 2012—Microsoft Windows DDI Team Blog—Site Home—TechNet Blogs, Sep. 15, 2012, retrieved from Internet: URL:http://blogs.technet.com/b/teamdhcp/archive/2012/09/15/scope-level-link-layer-filtering-using-dhcp-policies-in-windows-server-2012.aspx.
English translation of International Search Report and Written Opinion dated Oct. 12, 2015, for corresponding PCT Application No. PCT/ES2015/070422.
International Preliminary Report on Patentability dated Aug. 2, 2016, for corresponding PCT Application No. PCT/ES2015/070422.
Spanish Office Action, for Spanish Patent No. 201430822, dated Sep. 8, 2015, 5 pages.

* cited by examiner

ASSIGNMENT AND DISTRIBUTION OF NETWORK CONFIGURATION PARAMETERS TO DEVICES

TECHNICAL FIELD OF THE INVENTION

The present invention applies to the telecommunications sector and relates particularly to network equipment (device) configuration. More specifically, the invention described in the present specification relates to the inclusion of mechanisms for improvement (for example, security improvement) in the dynamic network device (also referred to as equipment) configuration by means of dynamic host configuration protocol, DHCP.

BACKGROUND OF THE INVENTION

DHCP protocol is widely used in the state of the art for configuring equipments that are connected through a communications network. This protocol defines mechanisms for supplying configuration information to hosts in a communications network (for example, a TCP/IP, Transmission Control Protocol/Internet Protocol, network). The DHCP can be said to have two main functions: supplying specific configuration parameters to each equipment (host) and supplying and assigning network addresses to the network equipment. The DHCP uses a client-server model, such that a designated DHCP server assigns network addresses and supplies network configuration parameters to pieces of network equipment (devices) that would be the client equipment.

In the IT field, the term host is used to refer to pieces of electronic equipment (devices) connected to a network which provide and/or use services of said network; and which are used by the network users to have access (in and/or out) in the network. The hosts can be computers, tablets, PCs, mobile telephones, smartphones, laptops and generally any electronic device or equipment that can be connected to a communications network. Generally, a host is any piece of electronic equipment connected to a network and which requires an identification thereof (this identification is usually a network layer address, for example, IP). The host is interconnected with one or more equipments, such that it works as a data transfer start and end point, among other functions. The host can, for example, store a web site and usually has, in addition to a network address (a unique network address in the local network), a unique domain name or host name.

In other words, the DHCP is a set of rules used by communication equipment connected to a communications network (hosts), which allow the equipment to request and obtain a network address (normally an IP address) and other network configuration parameters that it needs to operate from a server in a dynamic manner, i.e., without particular intervention. For example, the DHCP server can offer and provide, among others, the following identification or service parameters to those clients making requests within the same network area:

IP address
Subnetwork mask
Predetermined gateway
Broadcast address
Maximum waiting time for address resolution or ARP (address resolution protocol)
Maximum transfer unit or MTU
Domain name server or DNS address
Network time protocol or NTP servers
Simple mail transfer protocol or SMTP server
Post office protocol 3 or POP3 server
Trivial file transfer protocol or TFTP server
Network information service or NIS server
NIS domains
Windows internet naming service or WINS server name The DHCP can usually be implemented in local area networks (LAN), wide area networks (WAN) although it can be used in any other type of communications networks.

The DHCP protocol allows automatically distributing IP addresses in a network and these addresses are therefore assigned in a network environment (a local network, LAN, a wide network, WAN or other types of network). Taking the reference models of network levels or layers such as the OSI stack or TCP/IP stack as example, the protocol in question would act on the network level, level 3 or logic level. The basic communication system is BOOTP (with UDP frame). The BOOTP (Bootstrap Protocol) is a transport protocol for obtaining configuration information. Equipment usually does not have any information concerning its network configuration during start-up and the user must enter the necessary network data to be able to connect to the network, if the user does not have said information the DHCP protocol automatically assigns an IP address to said user, subsequently offering the IP address to him so that it is accepted and finally configured in client network device. On the other hand, the DHCP server will usually be organized based on two databases: a static database for the use of BOOTP (containing the IP addresses assigned by the network administrator, by means of manual configuration, for assigning a specific IP address) and another database with a stack of available addresses, which will be responsible for facilitating the data in an automatic or dynamic assignment.

Today there are three assignment mechanisms whereby the DHCP protocol could assign IP addresses to network devices to which it offers service. A network can use one or more of these mechanisms:

Manual (static) assignment: The network administrator manually configures the IP addresses of the client in the DHCP server. When the client device requests an IP address, the server verifies a parameter identifying the client, for example, the media access control or MAC address of the client device and proceeds to assign the IP address configured by the administrator for said client. The DHCP only supplies the IP address previously assigned by the network administrator (when configuring the DHCP server) to each piece of client equipment and the DHCP server cannot deny a client of an IP address.

Automatic (unlimited) assignment: An IP address is assigned to the DHCP client when it connects for the first time with the DHCP server. In this method, the IP is randomly assigned and not configured in advance. The assignment is permanently performed to the client requesting it, until the client frees it up.

Dynamic (limited) assignment: The DHCP server assigns an IP address to a client device (also referred to as equipment) during a given maximum time. When this time lapses (if the equipment has not previously freed the IP address up and/or network access has concluded), the IP address is revoked and the device cannot work until the DHCP server gives it another IP address. The IP address which is assigned to the device can be different every time the device requests an address (i.e., there is no permanent assignment between the device and IP address). Dynamic assignment is the only one of these three mechanisms which allows reusing the addresses (i.e., one and the same address can be used by different client equipment at different times). Therefore, dynamic assignment is particularly useful for assigning addresses to clients that are only temporarily connected to the network or for sharing a limited set of IP addresses between a group of clients (since IP addresses tend to be scarce).

Ultimately, the DHCP (as defined for example in RFC2131 of Network Working Group) is a protocol designed primarily for saving time, managing IP addresses and automatically configuring all the devices with an IP address (and other parameters) without needing human intervention. Despite all the useful functions offered by the DHCP protocol, there are various very negative aspects when using this system. These negative aspects are mainly security aspects, since there are security drawbacks today that can cause undesired operation of the clients of a network and the DHCP protocol does not avoid and they therefore constitute the vulnerabilities of the DHCP protocol. Some of these security problems are:

Malicious server: The automation of the DHCP protocol is a great security risk if a malicious DHCP server is introduced into a network, if it is not under the control of the company staff (or the network area administrators) and can therefore offer IP addresses to the devices that are connected thereto. If a user connects to the malicious DHCP, the information sent through this connection can be intercepted violating the privacy of the user, the network and the company.

Universalization of the DHCP protocol: Today most routers and switches on the market have the DHCP protocol implemented therein. This means that any user who wishes to access a network (through wired connection, WIFI or any other means) could easily access same if he uses said protocol.

Multiple subnetworks or network segments: There are environments where a single DHCP server is insufficient and each network segment may need its own DHCP server, or a DHCP relay agent (which requires additional configuration, entailing additional time and highly increased costs). If no option is viable, all the network elements (routers, switches . . . ) must be configured as emitters of the BOOTP protocol, which is an older and less advanced protocol than the DHCP protocol (with the resulting problems) and furthermore not all the systems can support said protocol.

Control of information flows: The DHCP server often uses ports 67 and 68 through UDP for receiving and sending data to the clients. Said flows can be controlled by a firewall, but this does not prevent those network intruders that can capture the packets related to said sensitive information from using same for passing oneself off as a client. Currently, the only mechanism offering control for this type of intrusion would be the integration of an IDS or intruder detector, with the subsequent cost and which in some cases is not worthwhile due to the size and shape of the network.

There is therefore the need to provide a solution which allows an optimum network address and parameter distribution, solving (and ultimately improving) the problems of conventional DHCP mechanism.

BRIEF DESCRIPTION OF THE INVENTION

The present invention allows securing, customizing and generally improving DHCP network address identification, assignment and distribution mechanisms and equipments (devices) configuration in a network (for example, a local area network), proposing an improved DHCP mechanism (service). This improved mechanism proposed by the present invention will be referred to as secure DHCP protocol, SDHCP.

To that end, in a first aspect the present invention proposes a method for the assignment and distribution of network configuration parameters to a device in a communications network, where the method comprises the following steps performed by a network element:

receiving from the device a layer 2 (of the OSI model) message (for example, a DHCPDISCOVER), requesting network configuration parameters, where this message includes an identifier of the device;

determining in the network element if the identifier of the device is registered in a database of devices with allowed network access (i.e., if it is in the table of identifiers of devices (MAC addresses) with allowed access);

if the identifier of the device is registered in the database of devices with allowed network access:

c1) assigning a network access profile to the device obtained from the database depending on the identifier of said device;

c2) assigning to the device a set of network configuration parameters depending on the access profile assigned thereto, said set of network configuration parameters including a network address for the device, where said network address (for example, IP) belongs to a range of network addresses available for the device depending on the access profile assigned thereto;

c3) sending a layer 2 message (for example a DHCPACK) to the device with the network configuration parameters assigned to the device.

In one embodiment, step c2) comprises:

c21) obtaining from the database, depending on the access profile assigned thereto, a set of network configuration parameters available for the device, said parameters including the range of network addresses available for the device;

c22) sending a layer 2 message (for example, a DHCPOFFER) to the device, including said network configuration parameters available for the device;

c23) receiving from the device a layer 2 message (for example, a DHCPREQUEST), with the configuration parameters chosen by the device from among the available network configuration parameters sent in step c22, where said chosen configuration parameters include a network address of the set of network addresses available for the device;

c24) assigning to the device the chosen configuration parameters received in step c23).

The network configuration parameters include, for example, at least one of the following: network address (IP), subnetwork mask, gateway, duration of the address assignment, domain name server address, broadcast address, maximum waiting time for address resolution or ARP, NTP server address, POP3 server address, SMTP server address or any other type of network configuration parameters.

The communication between the device and the network element are carried out by means of the DHCP protocol (i.e., the communication is carried out using DHCP protocol messages).

Devices wishing to access the network can be computers, tablets, PCs, mobile telephones, smartphone, laptops and generally any electronic device or equipment that can be connected to a communications network.

The network address assigned to the device in step c2) can grant restricted network access, depending on the range of network addresses to which said address belongs. In other words, the network elements such as routers, switches, . . .

, will therefore be configured for, if the network address assigned to the device belongs to a certain set of network addresses (which will depend on the profile assigned to the device), granting restricted network access to the device.

Said network access restrictions can be of any type, such as for example:

denying sending data to the device;
denying communication with the rest of the network devices;
denying accessing at least one port;
denying communication by means of at least one protocol;
authorizing only Internet access;
accessing the network within a given time period, etc.

If the identifier of the device is not in the database as a device having allowed access, it will not have network access and the network configuration parameters will not be sent to it. Additionally, the network element can store the identification of the device as a device having denied network access. In one embodiment, when the router receives the parameter request, it checks if the identifier of the device is in this table of devices having denied network access and if it is, the router does not continue with the method but rather the device will directly not have network access and the network configuration parameters will not be sent to it.

In one embodiment, the method further comprises:

d) if the identifier of the device is not registered in the database as a device having allowed network access, sending a layer 2 message to the device indicating that access is denied. Additionally, the network element can store the identification of the device indicating that a network access denial message has already been sent thereto. This denial message can be sent at all times or only the first time (i.e., if it is stored in the database as a device to which a denial message has already been sent, access denial will not be sent to it again).

In one embodiment, the method further comprises:

e) if a change occurs in the security conditions of the device (these conditions can be directly verified by the network element or the network administrator), the network element (for example, because it is thus programmed or because the network administrator manually does it) changes the profile assigned to the device in the database and therefore, changes the range of network addresses available for same. The network element can assign this new range of network addresses available for the device the next time it receives a network configuration parameter request message from said device. Alternatively, when a change occurs in the profile assigned to the device, the network element can, without receiving a new request message from the device, send a message to the device, assigning it this new range of network addresses available for same (the device will then choose a network address from this new range of available addresses and the network element will assign it) or, the network element can directly send a message to the device, assigning it new network configuration parameters, including a new network address within this new range of available addresses.

This change in the security conditions can be, for example, the fact that the device is infected with a computer virus, that the device does not have updated computer virus database or that the device has updated virus databases or is no longer infected with a computer virus.

The database is stored in the network element. Said database can contain:

A first table with the identifiers of those devices having network access (the MAC address and, optionally, IMEI, IMSI or MSIDSN);

A second table with the profile assigned to those devices having network access according to their identifier (the MAC address and, optionally, IMEI, IMSI or MSIDSN) and A third table with the set of configuration parameters (including the network addresses) available for each profile of the preceding table.

The identifier of the device which is included in the request message can be one of the following: the MAC address, IMEI, IMSI or MSISDN of the device. In one embodiment, the identifier which is used in the database for indicating which devices have network access is at least the MAC address of the device (i.e., the database saves the profiles and the ranges of network assigned to each profile, for each MAC of devices having network access). Furthermore, IMEI, IMSI or MSIDSN can also be used, i.e., the database saves the profiles and the ranges of network assigned to each profile, not only for each MAC of devices having network access, but also for IMEI and/or IMSI and/or MSIDSN of the device associated with that MAC.

The messages received from the device and the messages sent to the device by the network element can be broadcast messages, using a broadcast address of the network. In one embodiment, the message which is sent in step c3, may not be broadcast message but rather a message directed to a specific device, since the network element already knows the identification of the device.

The network element is a router or switch which allows (manages) communications network access and can belong to the communications network to which it allows access.

In a second aspect, the present invention proposes a network element (switch, router . . . ) for the assignment and distribution of network configuration parameters to a device for communications network access, the network element is a router or switch which acts at OSI model layer 2, which allows (manages) communications network access, where the network element (which can be said to act as a improved address server and generally an improved network configuration parameter server) comprises:

a database comprising:

a list of identifiers of those devices having network access; the profile assigned to those devices having network access according to their identifier and the set of configuration parameters available for each profile, where the set of available configuration parameters comprises a range of network addresses available for each profile;

means for receiving from the device a layer 2 message, requesting network configuration parameters, where this message includes an identifier of the device;

a processor configured for:

determining if the identifier of the device is registered in the database;

if the identifier of the device is registered in the database of devices with allowed network access, consulting the database for assigning a network access profile to the device depending on the identifier of said device and assigning to the device a set of network configuration parameters depending on the access profile assigned thereto, said set of network configuration parameters including a network address for the device, where said network address belongs to the range of network addresses available for the profile to which the device belongs;

determining, according to the network access profile assigned to the device, whether to grant a restricted network access to the device, where the restricted network access include at least one of the following restrictions:

denying sending data to the device;

denying communication with other network devices;

denying communications through at least one certain port;

denying communication by means of at least one protocol;

authorizing only Internet access;

accessing the communications network only within a given time period;

means for sending a layer 2 message to the device with the network configuration parameters assigned to the device.

Finally, a third aspect of the invention relates to a computer program comprising computer executable instructions for implementing the described method, when being run in a computer, a digital signal processor, an application-specific integrated circuit, a microprocessor, a microcontroller or any other form of programmable hardware. Said instructions can be stored in a digital data storage medium.

For a more complete understanding of the invention, its objects and advantages, reference can be made to the following specification and to the attached drawings.

DESCRIPTION OF THE DRAWINGS

To complete the description that is being made and for the purpose of aiding to better understand the features of the invention according to a preferred practical embodiment thereof, a set of drawings is attached as an integral part of said description in which the following has been depicted with an illustrative and non-limiting character.

DETAILED DESCRIPTION OF THE INVENTION

The present invention proposes an improved DHCP (SDHCP) mechanism or methodology (protocol), such that the configuration, assignment and distribution of (IP) addresses and network parameters in a communications network is performed in a more optimum and secure manner.

The communications network can be of any type both from the viewpoint of its structure (it can be a LAN network, a WAN network, or any other type of network) and of the communication technology it uses (it can be wired network, a WIFI network or it can use any other type of communications technology). It can also be a private or public network. It will usually work under the OSI (Open System Interconnection) model and TCP/IP stack, although it can also be used in networks using other protocols.

Figure 1:
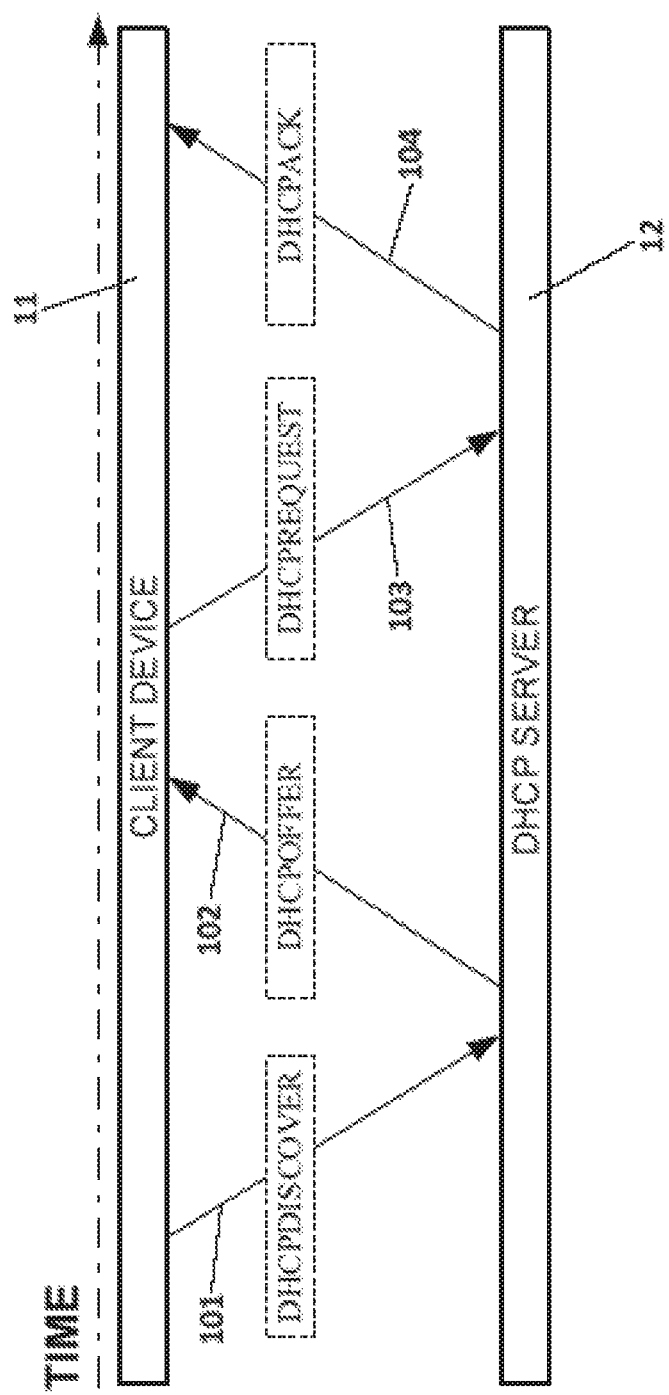
FIG. 1 shows a diagram of messages exchanged between a client device or equipment and a DHCP server for obtaining the network parameters, according to one embodiment of the state of the art.

To more clearly describe what constitutes the mechanism proposed in the present invention, how this work is performed in the current state of the art will first be described. FIG. 1 shows a timeline of the flow of messages exchanged in the state of the art between a client device or equipment (11) and a DHCP server (12) for the distribution of the parameters of a communications network (including the IP address) using a conventional DHCP protocol. Each of the steps to be performed for the assignment of IP addresses and other network configuration parameters is described and listed below:

The client device sends a level or layer 2 message (101) (for example, using datagrams, level 2 packets not aimed at connection); i.e., the message is produced before being taken to the logic level or level 3. Said message is sent through the communications network (in this case, local LAN network although it can be another type of network), using a broadcast address of the network, since the client does not have the server address and therefore cannot connect directly to the server. This message is referred to as DHCPDISCOVER and includes information which allows identifying the client device. It can also include another type of information, it can even request a given IP or indicate the time during which it needs said address.

The DHCP servers capturing the DHCPDISCOVER message (there can be more than one) respond (102) with a series of DHCPOFFER messages (one or more) in which they inform same of at least one available IP address. This message can include several available IP addresses (or a pool of IP addresses) and the client device is the one that chooses a specific IP address from those offered.

The client device receives one or more DHCPOFFER from one or more servers. The client selects one of the messages containing available IP addresses and sends another broadcast message (103) referred to as DHCPREQUEST. This message includes the identifier of the DHCP server which it chose and can also include the IP address it chose.

The DHCP servers of the network receive the DHCPREQUEST message, but only the server selected by the client device (that server the identifier of which is included in the DHCPREQUEST) will take it into account and respond to it. The rest of the servers will take this message as a notification that they have not been selected and that, therefore, the IP addresses they offered to the client are still available. The selected server creates a message of the entire network configuration needed by the client device (IP, subnetwork mask, gateway, duration of the address assignment, etc.). It gathers all this information in a message referred to as DHCPPACK and sends it (104). At this point, the information of the client device and the IP address that has been assigned thereto are already registered in the DHCP server, and when the client receives this message, it can start to use said address (optionally the client can perform a final check of the parameters sent thereto).

As will be described below, the present invention improves this process using policies based on roles (profiles) directly linked to the physical identification of the device (for example, the MAC address) are used. Thus, the SDHCP service will be able to make access restriction decisions (register-on and register-out), not only based on the assignment of IP identifier to the device that has access, but also based on the protection of level 2 (data link level of the OSI model) offered when denying any negotiation between the client and DHCP server without the client having been previously registered and managed in the roles.

This is possible due to the presence of a database accessed by means of a SDHCP functional element, known as a secure agent. This database relates level 2 network identifiers (MAC) of the network elements with level 3 identifiers (IP) and in turn with the user roles (profiles). This way the protection of the service is not reduced just to filtering MAC or to policies of assigning and reserving IP addressing, since it provides a strict control and link of each DHCP client connected in the same network area. Therefore, use of this new database for the new SDHCP service improves in terms of security the structure used until now in the DHCP protocol that uses two independent databases described in the Background of the Invention section (the structure of the BOOTP protocol and the structure storing the stack or set of available addresses already described above).

The secure agent is a functional module or element that is physically present in the same network element (also referred to as a network node) as the SDHCP server. This network element or node where the server and/or the secure agent is located can be a router, although in other embodiments it can be another type of network element such as a switch acting on the layer 2 of the OSI model or another type of nodes managing network access in some way, for example. The network element in which the SDHCP server (and/or the secure agent) is located must belong to the network or at least be present in the network area to which the DHCP server provides service, i.e., it must belong to said network or to a network having connection with the network to which it provides service. Within a network (for example, a LAN network), depending on the network characteristics and size, there can be more than one SDHCP server. Generally, there will be one primary SDHCP server and "N" secondary servers (where N is a network design parameter), such that the primary server is synchronized with the other servers for exchanging information such that the information in all the SDHCP servers is consistent. In one embodiment, there is one secure agent for each SDHCP server in the network. The same occurs with the database which can be in the same network node as the secure agent (for example, in one of the routers of the network) or in another network node (with which the secure agent communicates through a communications network).

It must be pointed out that the by-default denial of all those OSI level 2 broadcast requests derived from the process of requesting and offering between client and server is introduced as a security measure in the SDHCP. In other words, the decision of the proposed security system will be to deny, unless there is a user profile linked to the client device (to its MAC or identifier) in the database which allows assigning a network configuration to the device. As previously explained, during the process of assigning DHCP, the sending/receiving of datagrams directed to broadcast MAC address is performed in all the messages (DHCPDISCOVER, DHCPOFFER, DHCPREQUEST and DHCPACK) such that controlling and discarding those unauthorized requests entails an improvement, not only in terms of security, but also in terms of resource consumption of the device in which the SDHCP service is active. Furthermore, this method palliates vulnerabilities in the control of the information flow which was performed until now in the network layer or level 3 by means of firewalls and increases network access security.

Thus, for example, in the existing systems, a user of a device can manually configure the network parameters (IP address, subnetwork mask, gateway, DNS . . . ) and with these parameters configured in the device of the user, he will have access to the network. Using the mechanism proposed by the present invention, if a user wishes to manually configure the network parameters and wants these parameters to allow access to the network for the device, the device must be registered in the SDHCP secure agent database, since otherwise he will be denied access and the device will not be able to access the network.

Furthermore the mechanism proposed in the present invention prevents denial-of-service attacks; the objective of these attacks is to make accessing the network services and resources for a given period and accessing the network in a non-allowed manner impossible. One of these attacks is the saturation attack, wherein a very high number of requests is deliberately sent from one or more (malicious) devices to a network element (router, switch . . . ) of the network so the element is saturated and is incapable of responding to the real requests (i.e., requests from real user devices wishing to access the network). Furthermore, when saturated, the equipment receiving the attack usually restarts and this is when the attacking device can access the equipment and/or the network. Using the mechanism proposed by the present invention, the by-default denial applied in the low layer of the network element under attack (for example, a router) prevents such attacks, since the router denies access of all the devices not registered in the database of the SDHCP secure agent, so saturation attack has no effect. In other words, using the proposed SDHCP mechanism, if the router receives a request (for example, DHCPDISCOVER) from a device that is not in the table of SDHCP secure agent and which has already been denied access previously (for example, DHCPNULLPACK has been sent thereto), the router does not even respond with a denial but rather ignores the message. Likewise, if the router receives a broadcast message which is not a configuration request message (i.e., it is not DHCPDISCOVER) and the MAC address (or identifier) of the device is not registered in the table or database, the router will not send any message nor allow device access (ignore same). The result is that no matter how many messages the router receives from a device (in an attempt to saturate it), since it already ignores them, the router will not be saturated and will not restart, such that the attack will not be successful.

Figure 2:
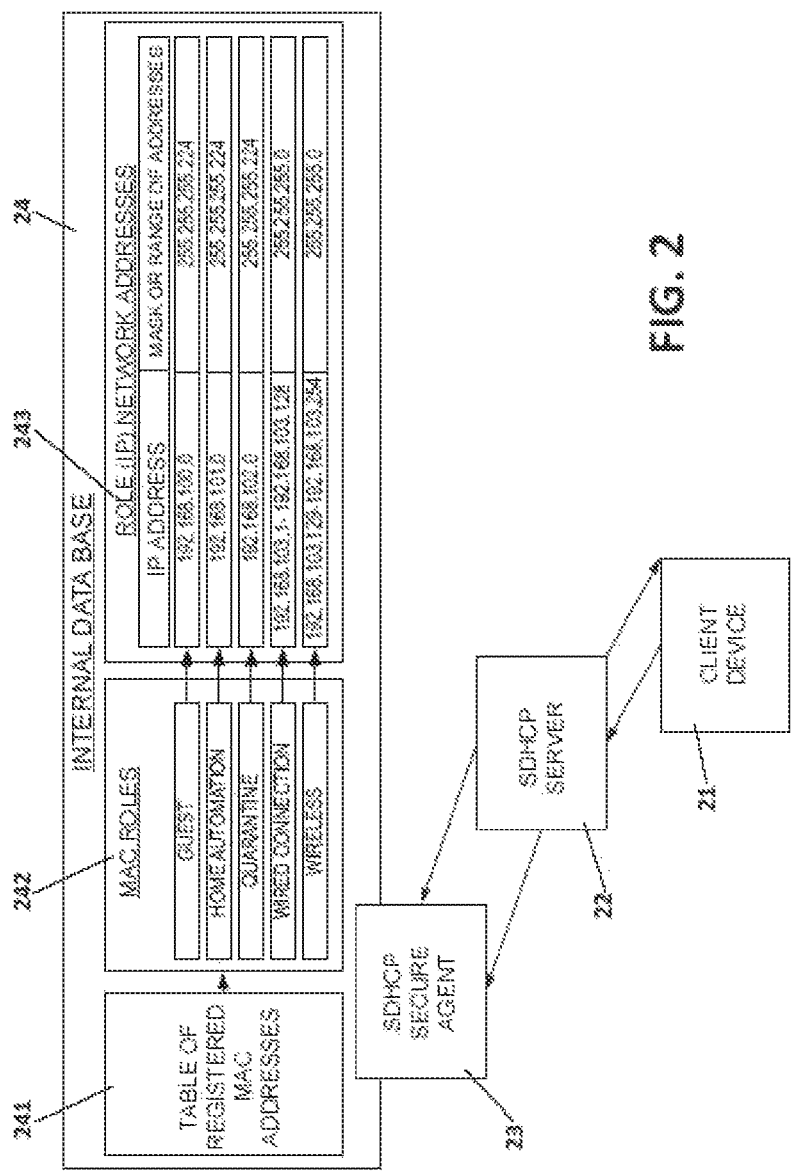
FIG. 2 shows a block diagram of the architecture of the SDHCP mechanism proposed according to one embodiment of the present invention.

FIG. 2 schematically shows the architecture of the proposed SDHCP protocol according to one embodiment of the invention. Said drawing shows the client device or equipment (21) that wishes to operate in a network (for example, a LAN or WAN network), the SDHCP server (22) responsible for supplying it with the configuration parameters needed for operating in said network (including the network address, for example, an IP address), the secure agent (23) and the internal database (24) with data for assigning the configuration parameters to the equipment.

The following elements (or tables of data), among others, can be stored in the internal database (24):

Registered MAC (241): The identifiers are stored herein (normally the MAC address, hence its name, although it can be another identifier such as IMEI, MSISDN, IMSI, LTE_ID . . . ) of the devices belonging to the network in question or, i.e., devices having authorized (allowed) network access. If the MAC address (or the corresponding identifier) of the device is not in this table, it will be considered that the device does not belong to the network and therefore, will not be able to access same.

The identifiers of any device the SDHCP server or the secure agent considers to have authorized network access (for example, because it is in other registers as authorized) can be automatically registered in this register. The network administrator can in turn enter in this table the identifiers of the devices that, according to him, must have authorized network access (this can be performed before starting up the router or during its operation).

Roles (profiles) MAC (242): It stores the profiles (roles) in the network of the devices. A limited number of profiles can be configured, depending on the processing ability of the equipment. In this table, one profile or another will correspond to each device of the network (for example, depending on its MAC address); in other words, from the MAC address of the device, the profile corresponding to the device is obtained through this table. In the case shown in FIG. 2, these profiles will be, for example, GUEST, HOME AUTOMATION, QUARANTINE, WIRED CONNECTION, WIRELESS; but obviously this is only an example and there can be many other different profiles.

In addition to (or instead of) the MAC address of the device, the registered MAC and MAC roles databases can contain other identifications of the device such as the IMEI, IMSI, MSISDN or any other parameter identifying the device. In other words, it stores not only the profile corresponding to the device depending on its MAC address but also depending on one or more of these other identifiers. In certain scenarios, instead of the MAC address, the device can send one of these other identifiers; in those cases the table will be verified in the same way but starting from this identifier of the device instead of the MAC address of the device.

Role (profile) IP addresses (243): It stores the IP subnetworks existing (defined) in the whole network, and a range of IP addresses (defined by an IP address and an address mask, for example) is automatically assigned according to the subnetwork to which each device belongs. The device will belong to one subnetwork or another (i.e., it will be assigned one range of IP addresses or another) depending on the profile that it was assigned in the previous table; in other words, in the previous table (242) the network profile corresponding to the device according to its MAC address is obtained and in this table (243) the range of addresses corresponding to said profile, and therefore to said device, is obtained (i.e., the network configuration which is assigned to the device depends on the profile it has). Thus, for example, if the device is a video surveillance camera, a HOME AUTOMATION profile would be assigned to it, and it will be assigned the network range of said profile, as a result.

A given number of subnetworks can be configured depending on the ability of the equipment. These ranges of network are configurable, the system administrator only needs to say how many devices will be linked to each subnetwork and the SDHCP secure agent will automatically configure the range of network. Depending on the subnetwork (range of network) where the device is assigned (which, in turn, will depend on its profile), there will be a series of implicit rules that will allow or deny access to other devices, as a security measure. For example for devices with the assigned profile of GUESTS, since they do not belong to the network, it is convenient to deny access to the devices of all other profiles. It is neither necessary nor convenient for HOME AUTOMATION equipment, due to the characteristics thereof, to be able to access any profile. These denials of access or configurations in general are achieved with the policies applied by the router(s) of the network. In other words, the router of the network will be configured such that if the address of the device belongs to a given range of addresses (corresponding to a given profile) it cannot access other ranges of addresses (corresponding to other profiles). These restriction policies (or more generally, security policies) can also be applied at the port level. Thus, the router can configure that if the address of the device belongs to a given range of addresses (corresponding to a given profile), said device will be able to access through a given port and not through another (which will entail whether or not it can access certain devices or services).

Thus, for example, in the case shown in FIG. 2, the range of IP addresses 192.168.102.0/x will correspond to a device having a QUARANTINE profile. It is decided (by the network administrator) that the devices having this profile will only have access to the Internet and for a limited time, but will not have access to other network resources and will not be able to communicate with other devices of the network. The router (or the routers if there are more than one) of the network is configured to that end, such that a denial of access to the whole network and all the devices of the network is applied to a device whose address is in the range of network corresponding to the QUARANTINE profile (for example, by means of a command in the router of the type "set polycy id xxx group QUARANTINE to all drop"). Furthermore, for successfully limiting access to the Internet for this profile, the router can add a time policy (for example, by means of a command in the router of the type "set polycy id xxx group QUARANTINE start time H hours" (where H would be the number of hours access is to be given, for example, 4 hours).

In another example, continuing with FIG. 2, the range of IP addresses 192.168.100 0/x will correspond to a device having a GUEST profile. It is decided (by the network administrator) that devices having this profile (i.e., having an address in this range of network addresses) have access to the Internet but only with the use of the HTTP and HTTPS protocol, but that they do not have access to the remaining profiles or networks. As described for the preceding case, this is achieved by suitably configuring with the policies applied by the router, since a profile of guest (for example, the laptop of a guest connected to the network of a company) does not have to access the resources and networks of the company, so it is only given access to the Internet. Denial or access to the logic ports can also be applied here, i.e., the device belonging to this profile will be able to access the Internet through port 80 (http) but will not be able to access a server through SSH (port 22).

In another example, continuing with FIG. 2, the range of IP addresses 192.168.101.0/x will correspond to a device having a HOME AUTOMATION profile. It is decided that the devices having this profile (i.e., having an address in this range of network addresses) have access to the Internet with the HTTP, HTTPS, SSH, POP3 protocols and from Internet towards them.

The IP addresses in FIG. 2 will correspond to the devices having a WIRELESS or WIRED CONNECTION profile and with these addresses, it can be decided that they have access to the devices having the HOME AUTOMATION profile, but the HOME AUTOMATION profile will not have access to the other profiles, as indicated above. Security is thereby increased since the devices which will be in the HOME AUTOMATION profile are generally devices that must be visible from the Internet or send information to the cloud, so there is the risk of third parties finding vulnerability in these devices and that they can access these devices. If this occurs, by not allowing communication from this profile towards the internal network (i.e., to other devices of the network), the entire network and generally all the devices thereof (of all the profiles) will not be compromised.

In other words, according to the IP addresses assigned thereto (according to the profile) it will have restricted network access or not. If it has restricted access, generally speaking, it can comprise at least one of the following restrictions (or any other type of restriction):

denying sending data to the device;

denying communication with the rest of the network devices;

denying accessing at least one port;

denying communication by means of at least one protocol;

authorizing only Internet access;

accessing the network within a given time period.

The network administrator can configure these tables (databases) and change their content whenever this is required. The SDHCP secure agent can also dynamically make a series of decisions for adding profiles, modifying profiles, changing the device of the profile to which it is linked, changing the configuration parameters of each profile . . . according to the circumstances of the communication or different conditions detected in the device or in the network. For example, when the antivirus database of the device is not updated or the device has a virus or Trojan, the SDHCP agent can make the decision of temporarily deleting it from the profile to which it belongs and assigning another profile thereto (quarantine) so that the device will not infect the remaining devices within the profile (and the network) to which it was assigned. In other words, if the SDHCP agent detects that the security conditions of the device are compromised it can assign a more restricted network access profile thereto, and vice-versa, i.e., if the SDHCP agent detects that the security conditions of the device are no longer compromised (for example, its antivirus database is updated) it can assign a less restricted network access profile thereto. To that end, for example, when the antivirus detects that a device is compromised either because the antivirus database is not updated or because it is infected with a virus, the antivirus will put a mark or label to identify said device the security of which is compromised. A notification that the device is marked or labeled by the antivirus will be sent from the antivirus database towards the SDHCP secure agent. When the SDHCP secure agent receives this mark or label, it can change the profile of the device and assign it to the QUARANTINE profile. In other words, the SDHCP would receive this label from the antivirus database and change the IP address of the infected device (for example, by means of a DHCP renew) and assign a network configuration (and specifically an IP address) of the QUARANTINE profile to it. In the quarantine profile, it may only have external network access and for a given time so that it can update the antivirus software or eliminate the virus infection. While the device is in the quarantine profile, it will not have access to internal network services and resources. Usually, when the device is performing negotiations to access the network, requesting the configuration parameters of same (using SDHCP), the antivirus server runs a check and if it verifies that it is infected (or, for example, it does not have the antivirus database updated), it will send the message (for example, AV1CHANGE) to the SDHCP server and the profile that it will assign to it (and, therefore, the network configuration parameters that it will assign to it) will be the quarantine profile. If, in contrast, the client has already completed the process and is connected to the network, if the client receives a virus or Trojan while connected (or the antivirus database becomes outdated) and the antivirus detects it, the antivirus service will send the message AV1CHANGE to the SDHCP and the latter will change the profile to quarantine. The SDHCP will send a message to the device notifying the network configuration parameter change and will send the new configuration parameters (among them a new IP address) that will correspond to the new profile (the quarantine profile) and vice-versa, i.e., if the SDHCP agent detects that the security conditions of the device are no longer compromised (for example, its antivirus database is updated) it can assign a less restricted network access profile thereto.

These profiles are predefined in the database of the network element, the profiles are completely configurable and each of the profiles has its own security policies. In another practical case, when the secure agent detects that two different devices have two identical MAC addresses, the SDHCP will make the decision to put said MAC or device in quarantine and inform the network or system administrator by means of an e-mail or other means for subsequent analysis.

The SDHCP service can assign IP addresses in a static or dynamic manner. The static assignment is that in which the device is assigned the same address every time it connects to the network; i.e., the address is permanently assigned. In contrast, a dynamic address is that in which the IP address is assigned to a device temporarily, either for a given time or until the device is disconnected, such that a different address can be assigned every time the device performs connection. Whether this assignment is static or dynamic, the MAC address of each device allowed to access the network must be registered in the internal database, such that if a device requesting an IP address from the SDHCP is not registered in the database, the SDHCP will not proceed to assign any IP address thereto.

Figure 3:
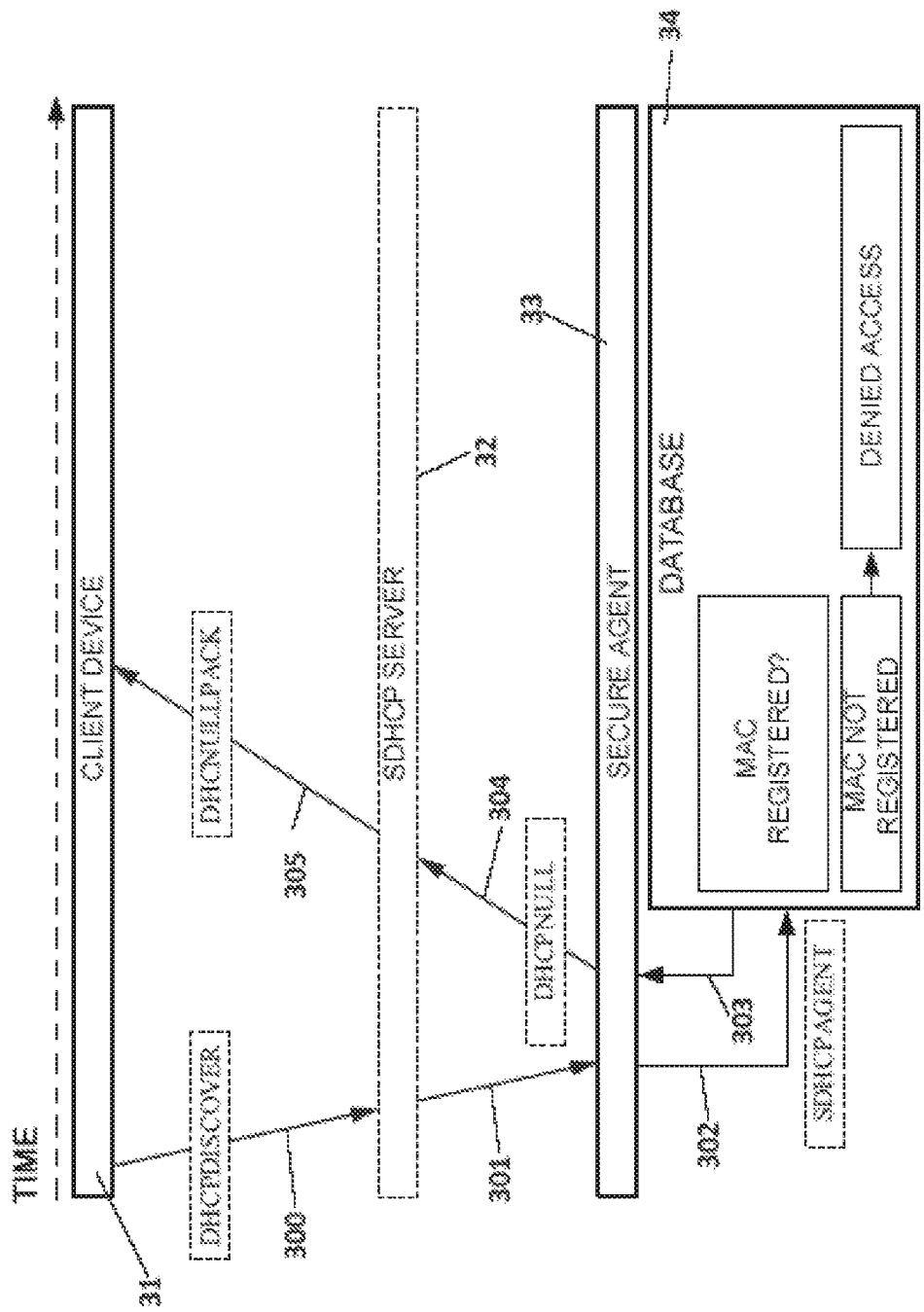
FIG. 3 shows a diagram of messages exchanged between a client device or equipment and a SDHCP server, in the case that said device is not registered in the internal database, according to one embodiment of the present invention.

FIG. 3 shows the flow of messages exchanged, according to one embodiment of the present invention, between a client device or equipment (31) and a DHCP server (32) using the proposed SDHCP protocol in the event that said device is not registered in the internal database (34). Each of the steps in this scenario is hereinafter described and listed, according to one embodiment of the present invention:

The client device (requesting the network configuration parameters because it wishes to access the network) sends (300) a message requesting the network configuration parameters, which is received by the SDHCP server (32). This message will be a DHCPDISCOVER message, for example, and in order to send it, the device will use a broadcast address since the client does not have the address of the IP server and, therefore, cannot directly connect thereto. This message includes information that allows identifying the client device (its MAC address or another type of identifier, for example). It can also include another type of information, it can even request a given IP or indicate the time during which it needs said address.

Once the SDHCP server (32) has the request, the server sends it (301) to the SDHCP secure agent (33). This message can be transmitted internally if the SDHCP server and the secure agent are in the same node, or through a communications network if they are not.

The SDHCP secure agent (33) sends (302) a message requesting information about the device which is requesting IP address assignment from the database (34). This message is referred to as SDHCPAGENT. This message can be transmitted internally if the secure agent and the database are in the same node or through a communications network if they are not.

Once the verifications in the database are performed, and since the MAC address of the device is not registered, the database sends (303) a message (SDHCPAGENT) to the SDHCP secure agent (33) with the information that the client device is not registered and that therefore an IP address cannot be assigned to the device. The SDHCP secure agent (33) sends a message referred to as DHCPNULL to the SDHCP server (32) which contains information needed for denying access (304). As indicated above, in addition to the MAC address of the device, other identifications of the device such the IMEI (International Mobile Equipment Identity), IMSI (International Mobile Subscriber Identity), MSISDN (Mobile Station International Subscriber Directory Number) or any other parameter identifying the device (in a unique manner) can also be registered in the database. In certain scenarios, instead of the MAC address, the device can send one of these other identifiers; in those cases the table will be verified in the same way but starting from this identifier of the device instead of the MAC address of the device.

The SDHCP SERVER sends the DHCPNULLPACK message, notifying the client that an IP address cannot be assigned. This message can include a notification asking the client to contact the network administrator in order to be properly registered.

If there was more than one SDHCP server, the behavior would be similar. In that case, there would be a primary or main SDHCP server and one or more secondary servers, depending on how large the network is. Each of those servers would have their SDHCP secure agent and their database; the secondary SDHCP servers are synchronized with each other and with the main server, whereby the databases of the SDHCP secure agents would be properly synchronized and would have the same information. If the device that wishes to access the network is not registered, the corresponding SDHCP server will send the DHCP-NULLPACK message to it. The operation would be similar to that of DHCP relay agents but with the profile databases in this case, instead of with the DB of the assigned ranges of IPs. As a result, this again demonstrates that the information exchange and security level between agents is performed at level 2.

Figure 4:
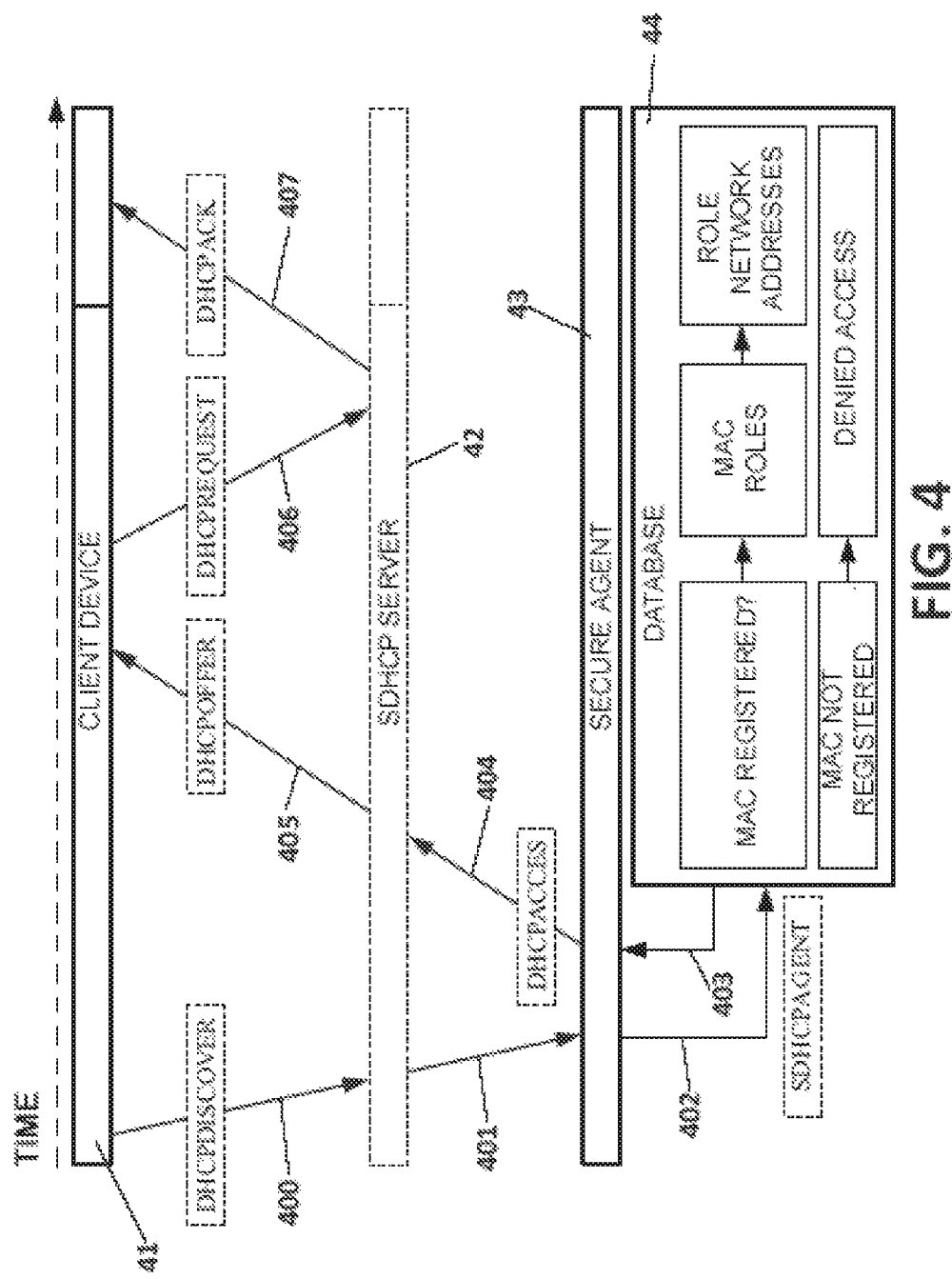
FIG. 4 shows a diagram of messages exchanged between a client device or equipment and a SDHCP server for obtaining the network parameters, in the case that said device is registered in the internal database, according to one embodiment of the present invention.

FIG. 4 shows the flow of messages exchanged, according to one embodiment of the present invention, between a client device or equipment (41) and a SDHCP server (42) for the distribution of the network parameters (including the IP address) using the conventional SDHCP protocol. Both the messages mentioned in this scenario and in the previous scenario (FIG. 3) are layer (or level) 2 messages (also referred to as link layer or level) of the OSI (Open Systems Interconnection) model. Each of the steps to be performed for assigning IP addresses and other network configuration parameters is hereinafter described and listed, according to one embodiment of the present invention:

The client device (requesting the network configuration parameters because it wishes to access the network) (41) sends (400) a message requesting the network configuration parameters (for example, the IP address) which is received by the SDHCP server (42). This message will be a DHCP-DISCOVER message, for example, and in order to send it, the device will use a broadcast address since the client does not have the address of the IP server and, therefore, cannot directly connect thereto. This message includes information that allows identifying the client device (its MAC address or another type of identifier, for example). It can also include another type of information, it can even request a given IP or indicate the time during which it needs said address.

Once the SDHCP server (42) has the request, the server sends it (401) to the SDHCP secure agent (43). This message can be transmitted internally if the SCHCP server and the secure agent are in the same node, or through a communications network if they are not.

The SDHCP secure agent (43) sends (402) a message requesting information about the device which is requesting network configuration parameter, particularly, IP address assignment from the database (44). This message is referred to as SDHCPAGENT and can be transmitted internally if the secure agent and the database are in the same node or through a communications network if they are not.

It is verified in the database (in the table of registered MAC addresses) if the MAC address of the device is registered. If it is not, the actions described in the preceding scenario would be taken. If the MAC address of the device is registered within the database (as is the case in this scenario), a user profile in the table of MAC roles (442) is assigned thereto according to the identification of said device. As previously indicated, other than the MAC address of the device, other identifications of the device such as IMEI, IMSI, MSISDN or any other parameter identifying the device can also be registered in the database. In certain scenarios, instead of the MAC address, the device can send one of these other identifiers; in those cases the table will be verified in the same way but starting from this identifier instead of the MAC address of the device. From the assigned profile, in the table of roles (243) of network addresses, the network configuration to which the client device belongs is assigned. The secure agent (43) obtains (403) this configuration and sends it (404) in a message to the SDHCP server (42). This message is referred to as DHCPACCES (404).

The SDHCP server (42) sends (405) a message (DHCPOFFER) to the client device (41) with the whole network configuration that has been assigned to said device according to the internal database (44). This message can include several available IP addresses (or a pool of IP addresses) and the client device is the one that chooses a specific IP address from those offered.

The client device receives the DHCPOFFER and sends another message referred to as DHCPREQUEST (406) by broadcasting, indicating the network configuration it chose (including the IP address it chose) if it received several possible ones.

The SDHCP server (42) receives the DHCPREQUEST message and creates a message with the whole network configuration that the client device needs and the profile that has been assigned to the client device based on the information obtained from the SDHCP secure agent (44). The server compiles all this information in a message referred to as DHCPACK and sends it (407) to the client device. At this time, the SDHCP server already has the information of the device registered. Therefore, this DHCPACK message can be a message specifically directed towards the device requesting the IP address, since the SDHCP server already has all the information thereof.

Like in the preceding case, if there was more than one SDHCP server, the behavior would be similar. In that case, there would be one SDHCP server and one or more secondary servers, depending on how large the network is. Each of those servers would have their SDHCP secure agent and their database; the secondary SDHCP servers are synchronized with each other and with the main server, whereby the databases of the SDHCP secure agents would be properly synchronized and would have the same information.

The present invention therefore proposes a methodology (mechanism) for assigning and distributing network configuration parameters, protecting the network and the network access devices (routers, switches . . . ) making up the network at the same time, providing network configuration parameters (for example, IP addresses) under communications control, management and protection. The main technical advantages of said methodology are, among others:

Identifying each device forming part of the network (as indicated, this identification can be performed through the MAC address, IMEI, IMSI, MSIDN or any other identification parameter of the device). This identification only allows identified devices to connect to the network, whereby minimizing the risk of any device passing itself of as another or any denial-of-service attack by equipment not in network. Generally, when the device is in the same network to which the SDHCP server belongs (i.e., it is in its network of origin), the MAC address thereof is available (i.e., its MAC address is included in the sent messages), so the SDHCP secure agent can assign the suitable security profile thereto according to the tables said agent has. However, when the device is out of the network in question, if a network node requests from the origin network the profile (or generally, the security policies) applicable to said device, what will be sent to the SDHCP server of the network will not be the MAC address of the device but rather another identification parameter (for example, IMEI, IMSI . . . ). This will not be a problem, since as indicated in the preceding paragraphs, in the tables of the SDHCP, the registered devices are not only registered based on their MAC address but rather that MAC address is also linked with other identification parameters (IMEI, IMSI etc. . . . ), so the correct profile can be assigned to said device, or in other words, although the device is out of the network, it "inherits" the same security policies the device has when it is in its network of origin.

The network element (for example, a router) assigning configuration parameters and the network are completely invisible to all the devices that are not registered (identified) (with the MAC address, IMEI, IMSI, MISDN or the ID of the device) in the internal database, since it ignores the broadcast transmission/reception of not registered equipment. In other words, if the router receives a request for IP addresses (for example, a DHCP_DISCOVER) from a device which is not in the internal table, it sends a denial (for example, a DHCPNULLPACK) to said device. The next time it receives a request message from said device, since it has already denied the device's access once, the router does not even respond with a denial message but rather ignores (disregards) the message. Likewise, if the router receives a broadcast message which is not a configuration request (i.e., it is not DHCP_DISCOVER) and the MAC address (or identifier) of the device is not registered in the table, the router will not send any message or give access (ignore) to the device either. This means that the router and the network are "invisible" to devices that are not registered (i.e., the devices do not have any information about same nor can they access same since the messages are not responded to). That is without a doubt a great progress in the field of security since the network is provided with intelligence that is not contemplated until now.

The intelligence of the new SDHCP protocol and the simplicity in decision making, in addition to the security it adds to wired or wireless communications, means that the SDHCP can make a series of decisions for adding, modifying or eliminating the device from the profile to which it is linked (i.e., based on the identification of the device, the SDHCP will make the decisions necessary for managing the device's access in manner that is suited to each situation). Thus, for example, as described above, if the device does not have updated antivirus database or has a type of virus or Trojan, the SDHCP will make the decision to remove the device from the associated profile and link it to the QUARANTINE profile.

Network access management is another strong point of the SDHCP, since it is capable of managing all the elements and devices of the network, this means that all the devices without exception will be managed continuously and audited by the new SDHCP service. The DHCP used today only assigns an IP address to each device requesting same, once the device has the IP address assigned, the system administrator can manually assign a static IP address, but nothing more. Furthermore, there are variations as regards traceability since information is added to the network identifier assignment process (information about profiles linked to each of the client devices).

Although many of the presented embodiments refer to routers having the functionality of a SDHCP server, the present invention is not limited to application thereof in routers but also in other network elements, such as for example, switches.

Note that in this text, the term "comprises" and the derivations thereof (such as "comprising", etc.) must not be understood in an exclusive sense, i.e., these terms must not be interpreted as excluding the possibility that what is described and defined may include additional elements, steps, etc.

Some preferred embodiments of the invention are described in the dependent claims included below.

Having sufficiently described the nature of the invention as well as the manner of carrying it out in practice, the possibility that the different parts thereof could be manufactured from a variety of materials, in a variety of sizes and shapes must be highlighted, those variations recommended by the practice also being able to be introduced in its constitution or method provided that they do not alter the fundamental principle of the present invention.

The description and drawings only illustrate the principles of the invention. Therefore, it must be noted that the persons skilled in the art could conceive several arrangements which, although have not been explicitly described or shown in this document, represent the principles of the invention and are included within its scope. Furthermore, all the examples described in this document are provided mainly for pedagogical reasons to aid the reader in understanding the principles of the invention and the concepts provided by the inventor(s) for improving the technique, and they must be considered as non-limiting with respect to such specifically described examples and conditions. Furthermore, all that is described in this document relating to the principles, aspects and embodiments of the invention, as well as the specific examples thereof, cover the equivalences thereof.

Although the present invention has been described in reference to specific embodiments, the persons skilled in the art must understand that the above and various other changes, omissions and additions in the shape and the detail thereof can be performed without departing from the essence and the scope of the invention as defined by means of the following claims.

The invention claimed is:

1. Method for the assignment and distribution of network configuration parameters to a device for communications network access, where the method comprises the following steps performed by a network element, where the network element is a router or switch acting on layer 2 of the Open Systems Interconnection (OSI) model, which manages access to the communications network:
   a) receiving from the device an OSI model layer 2 Dynamic Host Configuration Protocol (DHCP) message, requesting network configuration parameters, where this message includes an identifier of the device;
   b) determining in the network element if the identifier of the device is registered in a database as an identifier of a device with allowed network access; and c) if the identifier of the device is registered in a database as an identifier of a device with allowed network access:
  c1) assigning a network access profile to the device, obtained from the database depending on the identifier of said device;
  c2) assigning to the device a set of network configuration parameters depending on the access profile assigned thereto, said set of network configuration parameters including a network address for the device, where said network address belongs to a range of network addresses available for the device depending on the access profile assigned thereto;
  c3) sending an OSI model layer 2 DHCP message to the device with the network configuration parameters assigned to the device; and
  c4) determining, according to the network access profile assigned to the device, whether to grant a restricted network access to the device, where the restricted network access includes at least one of the following restrictions:
    denying sending data to the device;
    denying communication with other network devices;
    denying communications through at least one certain port;
    denying communication by means of at least one protocol;
    authorizing only Internet access; and
    accessing the communications network only within a given time period.

2. The method according to claim 1, where step c2) comprises:
  c21) obtaining from the database, depending on the access profile assigned thereto, a set of network configuration parameters available for the device, said parameters including the range of network addresses available for the device;
  c22) sending an OSI model layer 2 DHCP message to the device, including said network configuration parameters available for the device;
  c23) receiving from the device an OSI model layer 2 DHCP message, with the configuration parameters chosen by the device from among the available network configuration parameters sent in step c22, where said chosen configuration parameters include a network address of the set of network addresses available for the device; and
  c24) assigning to the device the chosen configuration parameters received in step c23).

3. The method according to claim 1, which further comprises:
  d) if the identifier of the device is not registered in the database, sending an OSI model layer 2 DHCP message to the device indicating that access is denied.

4. The method according to claim 1, which further comprises:
  d) if the identifier of the device is not registered in the database as an identifier of a device having allowed network access and an access denial message has not been previously sent to the device:
    d1) sending an OSI model layer 2 DHCP message to the device indicating that access is denied;
    d2) storing the identification of the device indicating that a network access denial message has already been sent thereto.

5. The method according to claim 1, where the method further comprises:
  e) if a change occurs in the security conditions of the device, the network element changes the profile assigned to the device and therefore, the range of network addresses available for same.

6. The method according to claim 1, where the identifier which is used in the database for indicating which devices have network access is at least the media access control (MAC) address of the device and where in step a), the identifier of the device which is included in the message is one of the following: the MAC address, International Mobile Equipment Identity (IMEI), International Mobile Subscriber Identity (IMSI) or Mobile Station International Subscriber Directory Number (MSISDN) of the device.

7. The method according to claim 1, where the messages received from the device and the messages sent to the device by the network element in preceding steps are broadcast messages, using a broadcast address of the network.

8. A network element for assignment and distribution of network configuration parameters to a device for communications network access, where the network element is a router or switch acting on the layer 2 of the Open Systems Interconnection (OSI) model, which manages access to the communications network and comprises:
  a database comprising:
    a list of identifiers of those devices having allowed network access; the profile assigned to those devices having allowed network access and the set of configuration parameters available for each profile, where the set of available configuration parameters comprises a range of network addresses available for each profile;
  means for receiving from the device an OSI model layer 2 Dynamic Host Configuration Protocol (DHCP) message, requesting network configuration parameters, where this message includes an identifier of the device;
  a processor configured for:
    determining if the identifier of the device is registered in the database as an identifier of a device with allowed network access;
    if the identifier of the device is registered in the database of devices as an identifier of a device with allowed network access, consulting the database for assigning a network access profile to the device depending on the identifier of said device and assigning to the device a set of network configuration parameters depending on the access profile assigned thereto, said set of network configuration parameters including a network address for the device, where said network address belongs to the range of network addresses available for the profile to which the device belongs; and
    determining, according to the network access profile assigned to the device, whether to grant a restricted network access to the device, where the restricted network access include at least one of the following restrictions:
      denying sending data to the device;
      denying communication with other network devices;
      denying communications through at least one certain port;
      denying communication by means of at least one protocol;
      authorizing only Internet access; and
      accessing the communications network only within a given time period; and means for sending an OSI model layer 2 DHCP message to the device with the network configuration parameters assigned to the device.

9. Digital storage medium for storing a computer program comprising computer executable instructions causing a computer executing the program to implement the method according to claim 1.

\* \* \* \* \*